United States Patent
Mullaney et al.

(10) Patent No.: US 9,341,806 B2
(45) Date of Patent: May 17, 2016

(54) FAN-OUT SUBASSEMBLY

(71) Applicant: Tyco Electronics Corporation, Berwyn, PA (US)

(72) Inventors: Julian S. Mullaney, Raleigh, NC (US); Eric E. Alston, Fuquay-Varina, NC (US)

(73) Assignee: CommScope Technologies LLC, Hickory, NC (US)

( * ) Notice: Subject to any disclaimer, the term of this patent is extended or adjusted under 35 U.S.C. 154(b) by 120 days.

(21) Appl. No.: 14/151,320

(22) Filed: Jan. 9, 2014

(65) Prior Publication Data

US 2014/0193130 A1    Jul. 10, 2014

Related U.S. Application Data

(60) Provisional application No. 61/750,625, filed on Jan. 9, 2013.

(51) Int. Cl.
| | | |
|---|---|---|
| *G02F 1/141* | (2006.01) | |
| *G02B 6/46* | (2006.01) | |
| *G02B 6/44* | (2006.01) | |

(52) U.S. Cl.
CPC .............. *G02B 6/46* (2013.01); *G02B 6/4471* (2013.01); *Y10T 29/49826* (2015.01)

(58) Field of Classification Search
CPC .................................................. G02B 6/4471
See application file for complete search history.

(56) References Cited

U.S. PATENT DOCUMENTS

| | | | |
|---|---|---|---|
| 6,061,492 A | 5/2000 | Strause et al. | |
| 6,816,663 B2 | 11/2004 | Daoud | |
| 7,270,485 B1 * | 9/2007 | Robinson et al. | ............... 385/55 |
| 7,461,981 B2 * | 12/2008 | Yow, Jr. | ............... G02B 6/4471 385/76 |
| 7,613,376 B2 * | 11/2009 | Wright | ............... G02B 6/4478 385/134 |
| 8,958,672 B2 * | 2/2015 | Mullaney | ............. G02B 6/4459 385/100 |
| 2005/0185910 A1 * | 8/2005 | Zimmel | ............... G02B 6/4453 385/135 |
| 2009/0060440 A1 * | 3/2009 | Wright et al. | ................. 385/135 |
| 2014/0193130 A1 * | 7/2014 | Mullaney | ................. G02B 6/46 385/135 |

* cited by examiner

*Primary Examiner* — Rhonda Peace

(74) *Attorney, Agent, or Firm* — Merchant & Gould P.C.

(57) ABSTRACT

A fan-out subassembly includes furcation modules mounted to a furcation module holder, which is adapted to be connected to a main component. The furcation module holder includes a cable anchoring location. Each of the furcation modules has a furcation tube mounting insert and a plurality of furcation tubes. The furcation tubes are supported by the furcation tube mounting inserts and have free portions that extend outwardly from the furcation tube mounting inserts and from the furcation module holder. The furcation tubes can hold optical fibers of a cable that extends from the subassembly to a cable spool. The subassembly and the free portions of the furcation tubes can be packaged together until installation.

20 Claims, 13 Drawing Sheets

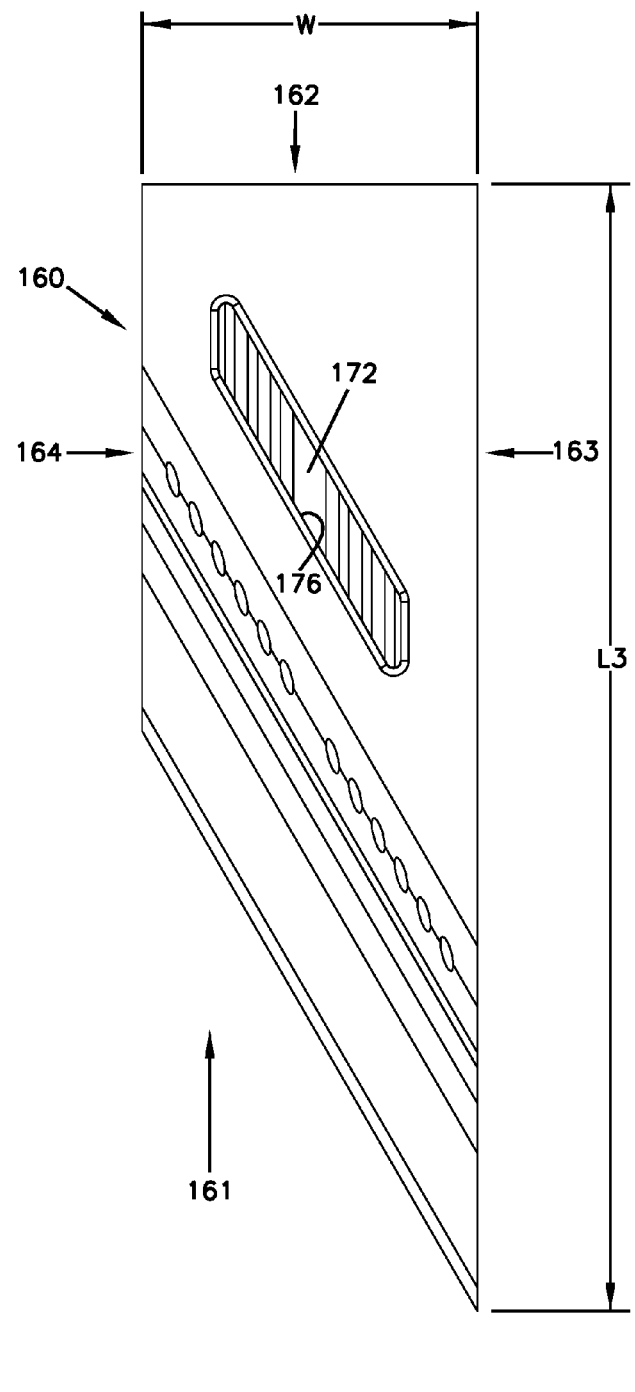
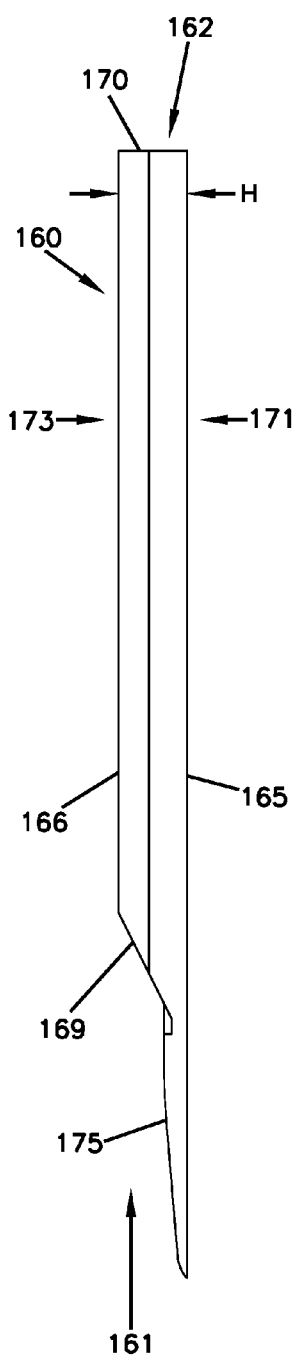

FAN-OUT SUBASSEMBLY

CROSS-REFERENCE TO RELATED APPLICATION

The present application claims the benefit of U.S. Provisional Patent Application Ser. No. 61/750,625, filed Jan. 9, 2013, which application is hereby incorporated by reference in its entirety.

BACKGROUND

In a fiber optic telecommunication network, a fan-out device is used to distribute optical fibers from a multi-fiber cable or tube containing multiple fibers to a plurality of individual furcation tubes. Fan-out devices are disclosed at, for example, U.S. Pat. No. 7,461,981 to Yow, Jr. et al., U.S. Pat. No. 6,816,663 to Daoud and U.S. Pat. No. 6,061,492 to Strause et al.

SUMMARY

The present disclosure relates to a fan-out subassembly adapted to be connected to a main component (e.g., using a fastener, a latch, a hook, a tab, a snap-fit, and a flange). The fan-out sub-assembly includes a furcation module holder; and a plurality of furcation modules. In an example, the furcation tube mounting inserts are stacked on the furcation module holder.

The furcation module holder is configured to be mounted to the main component. The furcation module holder includes a cable anchoring location. The furcation modules each have a furcation tube mounting insert and a plurality of furcation tubes. The furcation tubes are supported by the furcation tube mounting inserts. The furcation tubes have free portions that extend outwardly from the furcation tube mounting inserts. The furcation tube mounting inserts are mounted to the furcation module holder and at least sections of the free portions of the furcation tubes extend outwardly from the furcation module holder.

In some implementations, a cable can be anchored to the furcation module holder at the cable anchoring location. The cable can have optical fibers routed through the furcation tubes of the furcation modules. For example, the cable can include an outer jacket surrounding a plurality of buffer tubes, which hold optical fibers. The jacket of the cable can be secured to the furcation module holder by a cable tie. The cable can optionally include a tensile reinforcing structure (e.g., aramid yarn) that is anchored to the furcation module holder.

The present disclosure also relates to a method for installing a fan-out subassembly at a first location. The fan-out subassembly includes a furcation module holder and a plurality of furcation modules. The method includes pre-assembling the fan-out subassembly at a second location that is remote from the first location; transporting the pre-assembled fan-out assembly from the second location to the first location; and mounting the pre-assembled fan-out assembly to a main component provided at the first location. Pre-assembling the fan-out subassembly includes securing a cable to the furcation module holder; routing optical fibers of the cable through furcation tubes of the furcation modules; and securing the furcation modules to the furcation module holder.

In an example, the first location is a field location and the second location is an assembly facility (e.g., a factory, a warehouse, and an office). In an example, the cable includes an outer jacket surrounding a plurality of buffer tubes, which surround optical fibers. The cable also can include a tensile reinforcing structure that is anchored to the furcation module holder.

The present disclosure also relates to a kit including a cable spool assembly; and a fan-out subassembly. The cable spool assembly includes an optical cable wrapped around a spool. The optical cable includes an outer jacket surrounding a plurality of buffer tubes, each of the buffer tubes holding a plurality of optical fibers. A portion of the optical cable is routed into the fan-out subassembly, which includes a furcation module holder; and multiple furcation modules. The furcation module holder is configured to be mounted to a main component. The furcation module holder includes a cable anchoring location at which the optical cable is secured to the furcation module holder. Each of the furcation modules has a furcation tube mounting insert and a plurality of furcation tubes. The furcation tubes are supported by the furcation tube mounting inserts. The furcation tubes have free portions that extend outwardly from the furcation tube mounting inserts. The furcation tube mounting inserts are mounted to the furcation module holder and at least sections of the free portions of the furcation tubes extend outwardly from the furcation module holder. The optical fibers of the optical cable are routed through the furcation tubes of the furcation modules.

In some implementations, a packaging holds the fan-out subassembly. In certain implementations, the packaging holds the free portions of the furcation tubes.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 7 is a top plan view of the furcation module of FIG. 6;

FIG. 9 is a side elevational view of the furcation module of FIG. 6;

DETAILED DESCRIPTION

Figure 1:
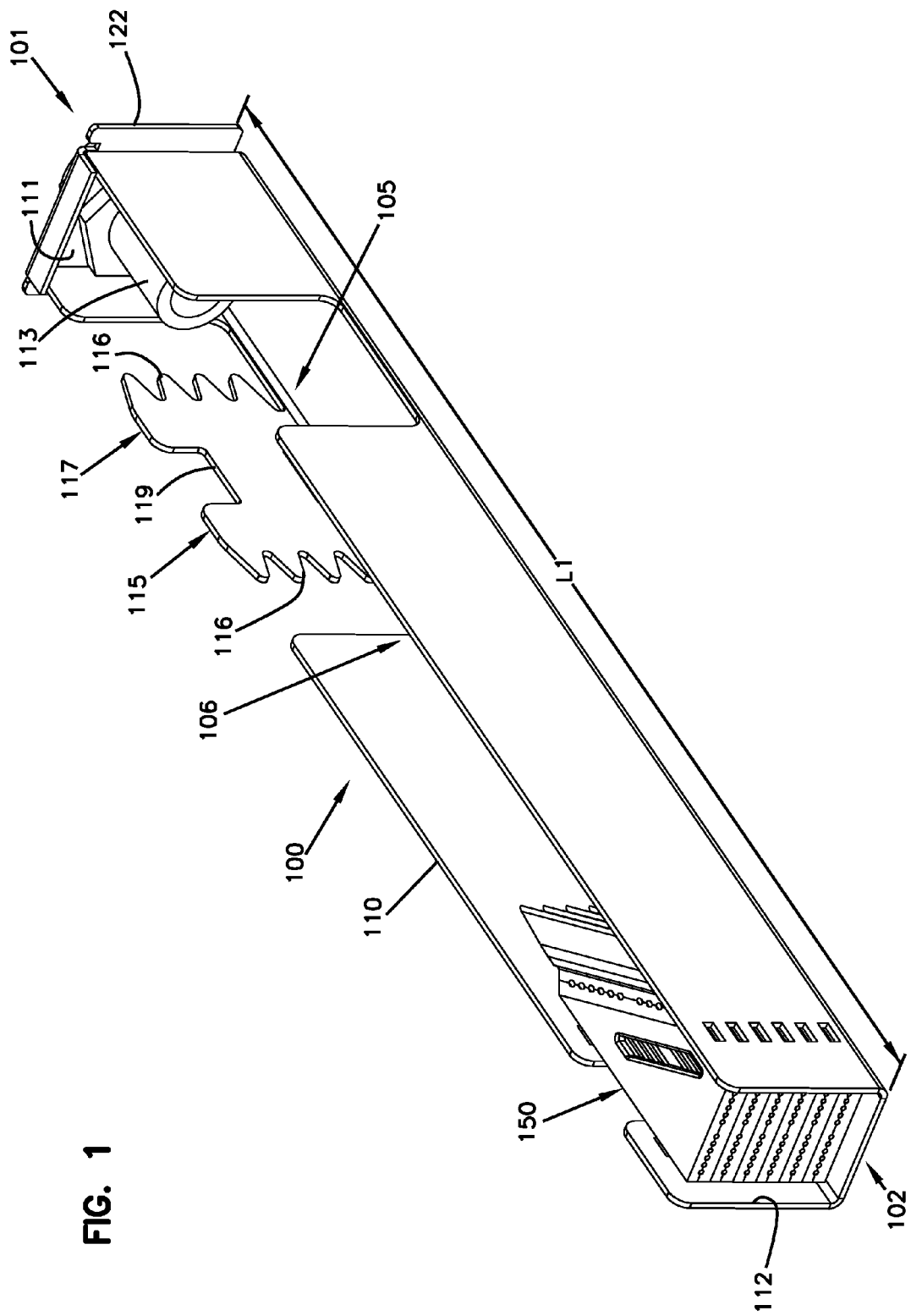
FIG. 1 is a perspective view of an example fan-out subassembly including one or more furcation modules mounted to a furcation module housing in accordance with the principles of the present disclosure.
Figure 2:
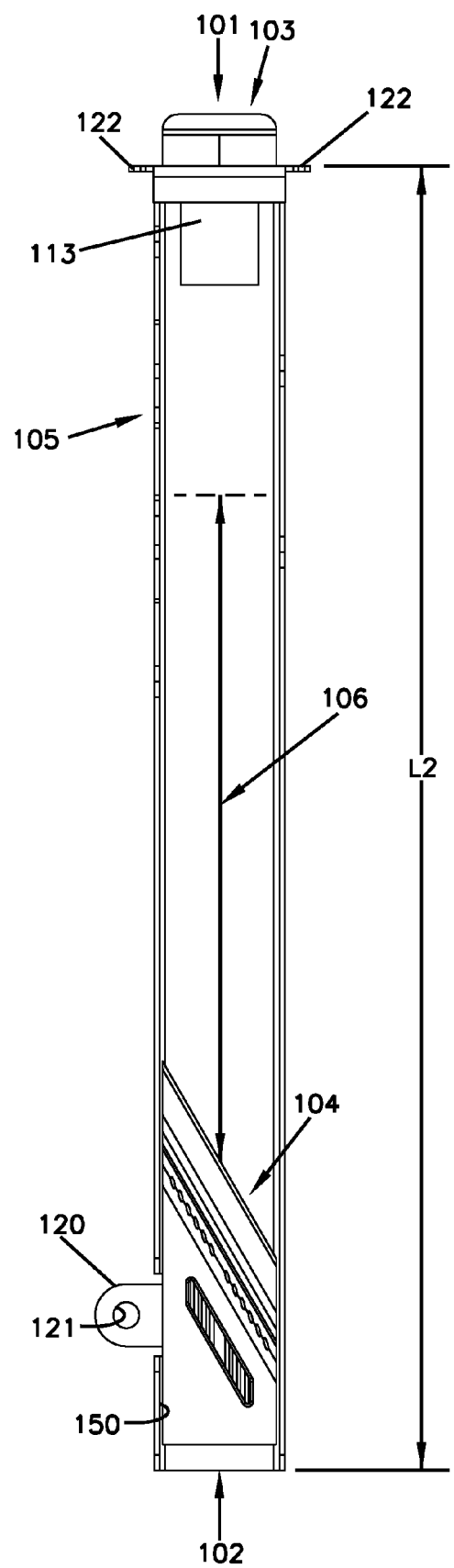
FIG. 2 is a top plan view of the fan-out subassembly of FIG. 1.
Figure 3:
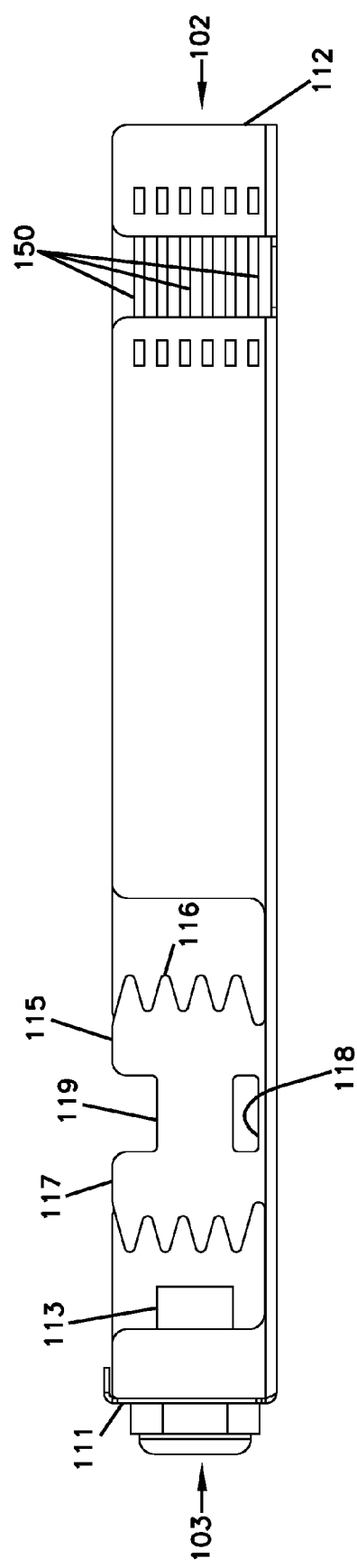
FIG. 3 is a side elevational view of the fan-out subassembly of FIG. 1.
Figure 4:
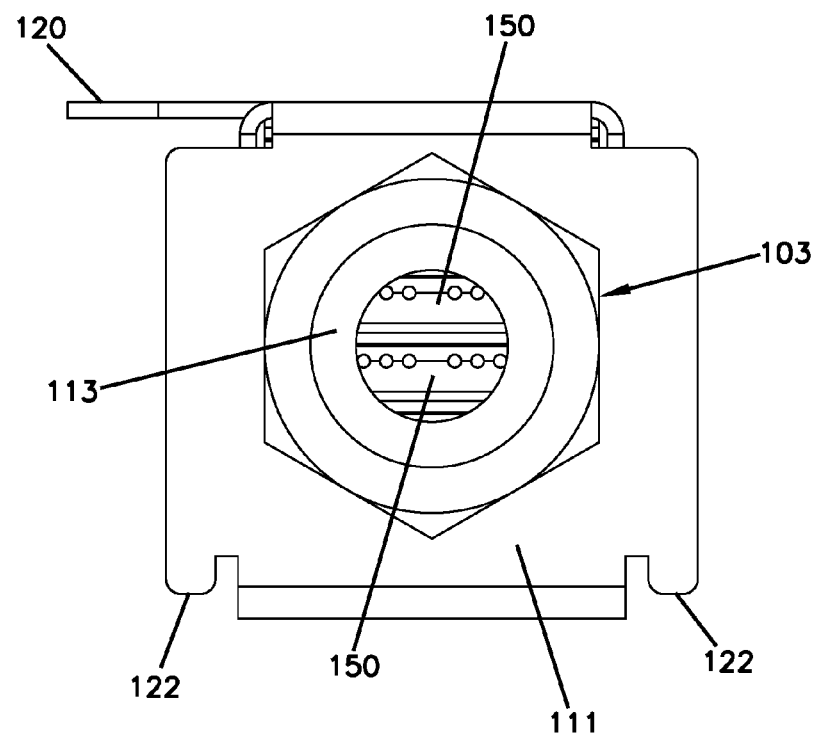
FIG. 4 is an end view of the fan-out subassembly of FIG. 1.
Figure 8:
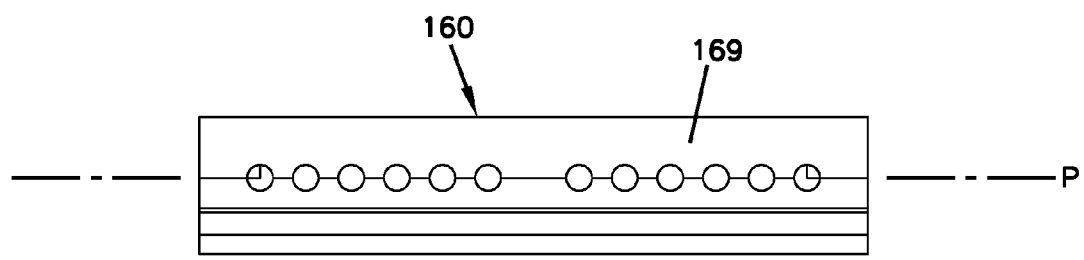
FIG. 8 is an end view of the furcation module of FIG. 6.
Figure 5:
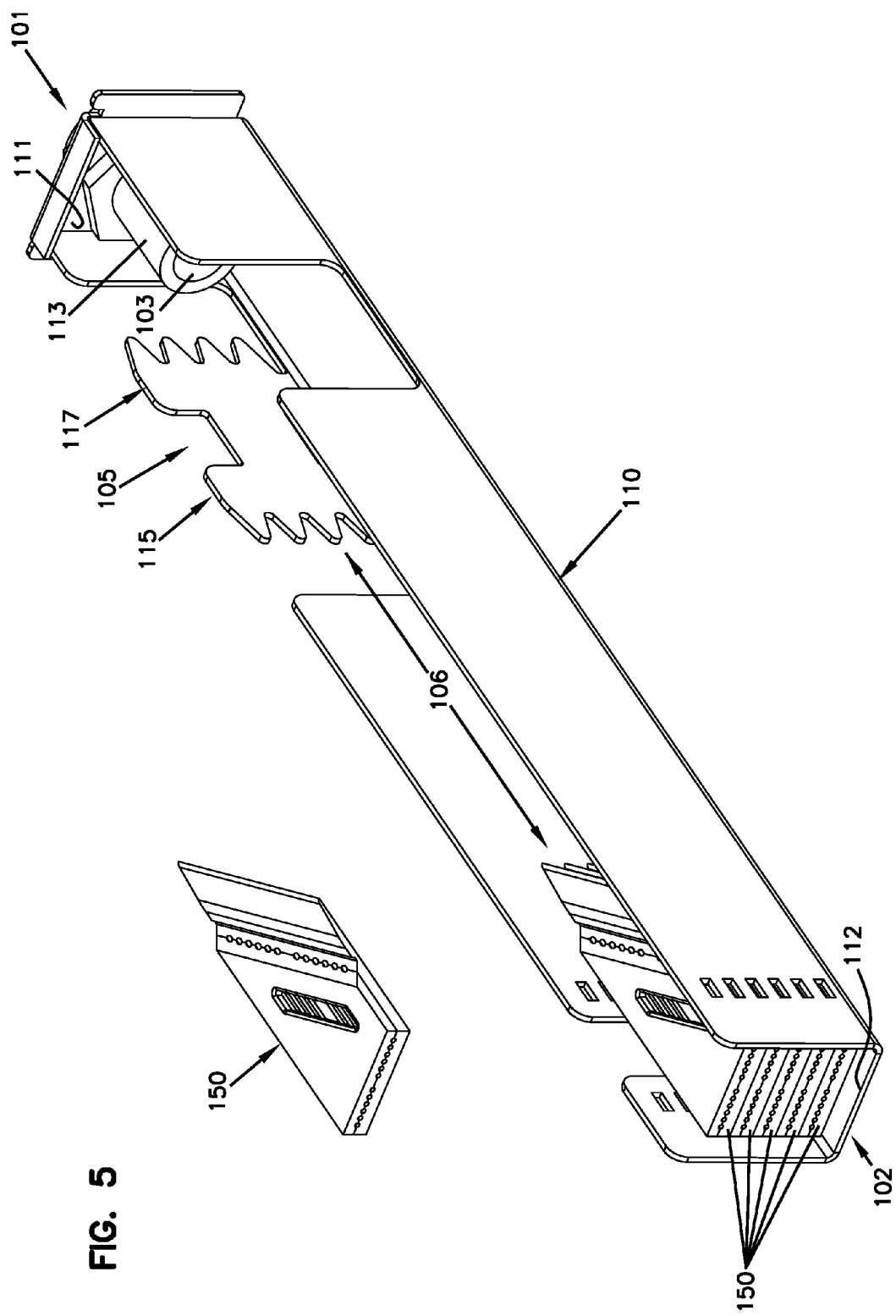
FIG. 5 shows one example furcation module exploded outwardly from the fan-out subassembly of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible examples of how inventive aspects in accordance with the principles of the present disclosure may be embodied.

Referring to FIGS. 1-5, a fan-out subassembly 100 configured in accordance with the principles of the present disclosure is illustrated. In general, the fan-out subassembly 100 is configured to receive an optical cable including two or more optical fibers held within one or more buffer tubes held within a jacket. The optical fibers of the optical cable are broken out from the buffer tubes within the fan-out subassembly 100 and are up jacketed with furcation tubes 155 (FIG. 6) that pass through one or more furcation modules 150 of the fan-out subassembly 100. The optical fibers and the furcation tubes 155 extend outwardly from the fan-out subassembly 100 to distal ends, which can be connectorized or unconnectorized.

Figure 11:
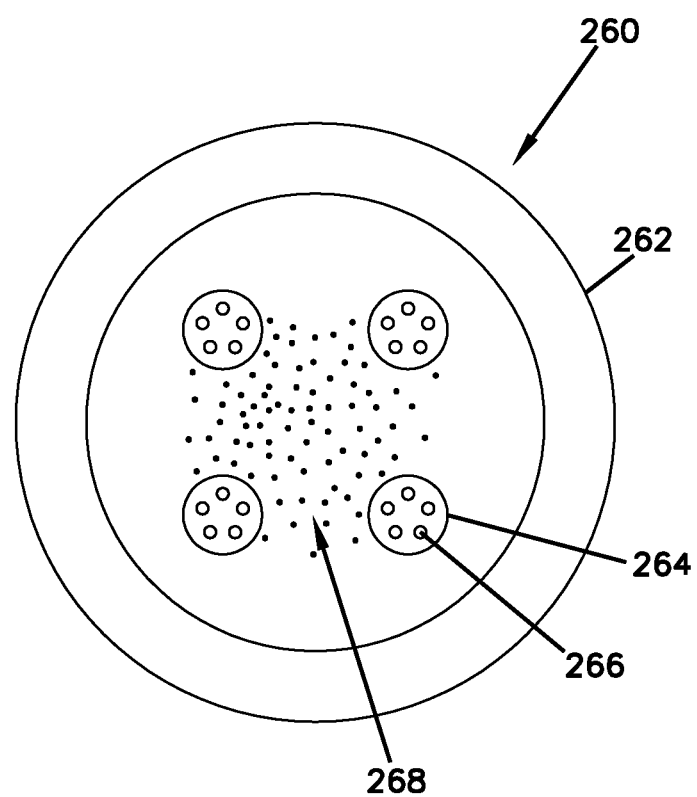
FIG. 11 is a transverse cross-sectional view of an example optical cable suitable for routing to the fan-out subassembly of FIG. 1.

FIG. 11 illustrates one example implementation of a fiber optic cable 260 suitable for routing to a fan-out subassembly 100. The fiber optic cable 260 includes a jacket 262 that surrounds two or more optical fibers 266. A tensile reinforcing structure 268 also is contained within the jacket 262. In an example, the tensile reinforcing structure 268 includes one or more strength members (e.g., aramid yarns) extending through the jacket 262. In some implementations, the fibers 266 can extend through one or more buffer tubes 264 within the jacket 262. For example, the fibers 266 can be tight-buffered, loose-buffered, or otherwise contained within the one or more buffer tubes 264. In certain implementations, multiple fibers 266 extend through each buffer tube 264. In an example, the fibers 266 within each buffer tube 264 can be ribbonized. In another example, the fibers 266 within each buffer tube 264 can be separate from the other fibers 266. In certain examples, the jacket 262 can surround between two and twelve buffer tubes 264, which each contain between one and twenty-four fibers 266.

In some implementations, the fibers 266 of one of the buffer tubes 264 are routed to the same furcation module 150. In certain implementations, the fibers 266 of multiple buffer tubes 264 can be routed to the same furcation module 150. For example, the fibers 266 of a first buffer tube 264 can be routed to furcation tubes 155 at a first side of the furcation module 150 and the fibers 266 of a second buffer tube 264 can be routed to the furcation tubes 155 at a second side of the furcation module 150. In other implementations, however, the fibers 266 of a single buffer tube 264 can be routed to multiple furcation modules 150. In certain embodiments, the fibers 266 can have cores of about 8-12 microns, cladding layers of about 120-130 microns in outer diameter, and coating layers of about 240-260 microns in outer diameter. The optical fiber 266 can be coated. Other fiber constructions can be used as well.

Referring back to FIGS. 1-5, in some implementations, the fan-out subassembly 100 extends along a first length L1 from a first end 101 to a second end 102. In certain implementations, the fan-out subassembly 100 defines a cable port 103 at the first end 101 and defines a furcation tube holding region 104 at the second end 102. In other implementations, the cable port 103 and/or the furcation tube holding region 104 can be recessed inwardly from the respective end of the fan-out subassembly 100. In some implementations, the fan-out subassembly 100 includes a cable anchor region 105 disposed between the first and second ends 101, 102. In certain implementations, the fan-out subassembly 100 includes a cable anchor region 105 disposed between the cable port 103 and the furcation tube holding region 104.

In accordance with some aspects of the disclosure, the fan-out subassembly 100 is configured to mount to a main component, such as a telecommunications housing (e.g., a termination enclosure, a splice enclosure, a cabinet, a chassis, etc.), a telecommunications panel, a telecommunications shelf, a drawer, etc. For example, the fan-out subassembly 100 can be configured to be fastened, snap-fit, latched, friction-fit, hung, and/or otherwise connected to a surface of the main component. In certain implementations, the fan-out subassembly 100 can be removably attached to the main component. In certain implementations, the fan-out subassembly 100 is configured to be mounted to the main component after being pre-assembled with the furcation modules and/or pre-cabled with the optical cable 260. For example, the fan-out subassembly 100 can be mounted to the main component while the optical cable extends outwardly from the first end 101 and the furcation tubes 155 extend outwardly from the second end 102. More details regarding one example main component 200 are provided herewith with reference to FIGS. 13-15.

In some implementations, the fan-out subassembly 100 includes a furcation module holder 110 that is configured to hold one or more furcation modules 150. In certain implementations, the furcation module holder 110 defines the cable port 103 and the cable anchor region 105 of the fan-out subassembly 100. In certain implementations, the furcation modules 150 hold and manage the furcation tubes 155. The furcation modules 150 mount to the furcation module holder 110 to define the furcation tube holding region 104 of the fan-out subassembly 100.

In the example shown in FIGS. 1-5, the furcation module holder 110 is elongated along an axis. The furcation module holder 110 includes a base having a length L2 that extends along the axis from an end wall 111 to an open end of the furcation module holder 110. In certain implementations, the length L2 is substantially the same as the length L1. In an example, the length L2 is identical to the length L1. In some implementations, the holder 110 includes a first sidewall arrangement and a second sidewall arrangement extending along the base between the end wall 111 and the open end 112 to define an interior of the module holder 110. An open top of the holder 110 can provide access to the interior. The interior defines an open-topped channel 106 through which the optical fibers 266 of the cable 260 extend from the anchoring location 105 to the furcation modules 150.

A cable pass-through fitting 113 is disposed at the first end wall 111 of the holder 110. The cable pass-through fitting 113 is sized to enable the optical cable 260 (e.g., including the jacket 262) to pass therethrough. In certain implementations, the cable pass-through fitting 113 extends inwardly from the end wall 111 into the interior of the furcation module holder 110. In an example, the cable pass-through fitting 113 has a tubular shape. In certain implementations, the fitting 113 has a grommet or other sealing structure that inhibits contaminants from passing through the end wall 111 of the holder 110 via the port 103.

Figure 13:
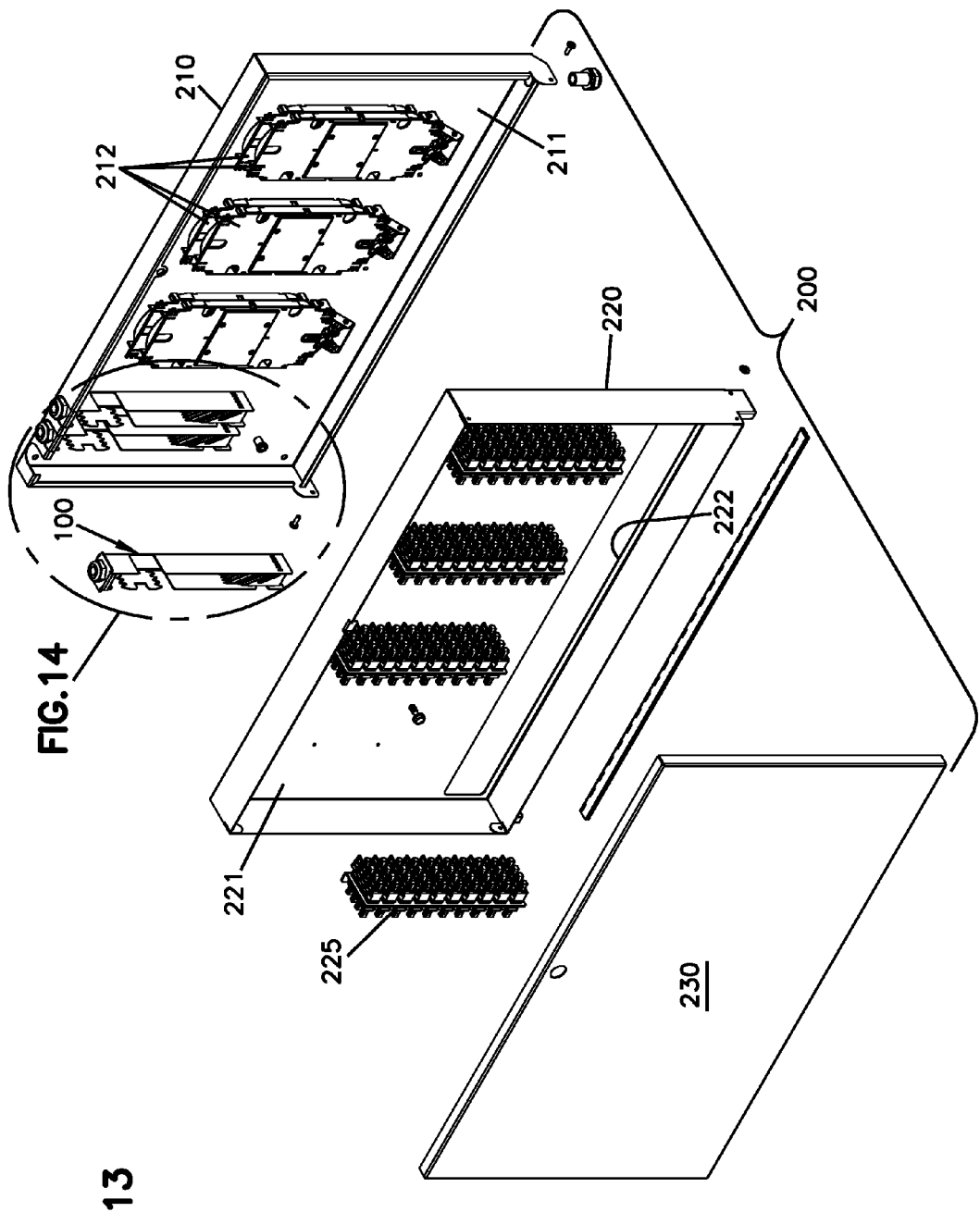
FIG. 13 is an exploded view of an example main component at which one or more fan-out subassemblies can be mounted.

In some implementations, the furcation module holder 110 is configured to mount to a main component (e.g., see main component 200 of FIG. 13). In certain implementations, the furcation module holder 110 is configured to be fastened to the main component. For example, the module holder 110 can include one or more tabs 120 that extend outwardly from at least one of the base and/or sidewall arrangements of the holder 110. Each tab 120 defines a fastener aperture 121 through which a fastener 215 (FIG. 14) may extend to hold in a fixed position the holder 110 relative to the main component. In certain implementations, the module holder 110 can include one or more flanges 122 that extend outwardly from the end wall 111 or another wall of the module holder 110. The flanges 122 can be configured to fit within grooves or to seat against an inner or outer surface of the main component 200 to hold in a fixed position the holder 110 relative to the main component (e.g., see FIG. 14).

In some implementations, a strength member anchor 115 is disposed in the holder 110 at the cable anchor region 105. The strength member anchor 115 is configured to secure one or more strength members (e.g., tensile reinforcing members) 268 of the optical cable 260 to the furcation module holder 110. For example, the strength member anchor 115 can be configured to enable one or more strength members 268 to wrap around the anchor 115. In certain implementations, the strength member anchor 115 forms part of one of the sidewall arrangements of the holder 110. In certain implementations, the opposite sidewall arrangement defines an opening or cut-out region to provide finger access to the cable anchor region 105. In an example, the strength member anchor 115 includes teeth 116 that face towards the end wall 111 and towards the open end 112 of the holder 110. In other implementations, the strength member anchor 115 can be formed by the base of the holder 110 or can be otherwise disposed in the holder 110.

In some implementations, a cable tie-down anchor 117 is disposed in the holder 110 at the cable anchor region 105. The cable tie-down anchor 117 is configured to secure the jacket 262 of the optical cable 260 to the furcation module holder 110. For example, the cable tie-down anchor 117 can be configured to enable a cable-tie, a yarn, or other flexible member to be wrapped around the optical cable jacket 262 and around the cable tie-down anchor 117. In other implementations, the flexible member can be wrapped around the buffer tubes 264 instead of the jacket 262. In certain implementations, the cable tie-down anchor 117 forms part of a sidewall arrangement of the holder 110 that extends between the end wall 111 and the open end 112. In certain implementations, the opposite sidewall arrangement defines an opening or cut-out region to provide finger access to the cable anchor region 105.

In some implementations, the cable tie-down anchor 117 defines an opening 118 and a notch 119 through which the flexible member can wrap to hold the cable jacket 262 to the cable tie-down anchor 117. In other implementations, the cable tie-down anchor 117 can define a greater or lesser number of openings 118 and/or notches 119. In certain implementations, the cable tie-down anchor 117 is formed by the same structure as the strength member anchor 115. In other implementations, the cable tie-down anchor 117 can form part of an opposing sidewall arrangement of the holder 110. In still other implementations, the cable tie-down anchor 117 can be formed by openings and/or notches defined in a base of the holder 110.

In some implementations, the furcation tube holding region 104 of the subassembly 100 is located at the open end 112 of the furcation module holder 110. In an example, edges of the furcation modules 150 facing the second end 102 of the fan-out subassembly 100 can be flush with the open end 112 of the module holder 110. In another example, the edges of the furcation modules 150 facing the second end 102 of the fan-out subassembly 100 can be recessed into the interior of the main component relative to the open end 112. In some implementations, the furcation modules 150 are oriented within the holder 110 so that the furcation tubes 155 of each module 150 form a row in a direction extending between the sidewall arrangements of the holder 110.

In certain implementations, the furcation module holder 110 includes attachment features that enable mounting of the furcation modules 150 to the furcation module holder 110 at the open end 112. Non-limiting examples of attachment features include a peg and hole arrangement, a tab and slot arrangement, latching fingers, etc. In certain implementations, the furcation modules 150 can be held completely within the interior of the holder adjacent the open end 112. In certain implementations, the furcation modules 150 are mounted between the opposing sidewall arrangements of the holder 110. In some implementations, the furcation modules 150 can be stacked together within the holder 110 so that the furcation tubes 155 extend outwardly from the furcation modules 150 and through the open end 112 of the holder 110. In certain implementations, the holder 110 can be sized to hold multiple stacks of the furcation modules 150.

FIGS. 6-10 illustrate one example implementation of a furcation module 150 suitable for use with the fan-out subassembly 100 of FIGS. 1-5. The furcation module 150 includes a furcation tube mounting insert 160 and an array of furcation tubes 155. The furcation tube mounting insert 160 includes a first end 161 and a second end 162 positioned opposite from the first end 161 (FIG. 7). The furcation tube mounting insert 160 also includes a first side 163 and a second side 164 positioned opposite from the first side 163 (FIG. 7). The furcation module 150 has a length L3 that extends between the first end 161 and the second end 162 of the furcation tube mounting insert 160. The first side 163 of the furcation tube mounting insert 160 extends along the length L3 of the furcation tube mounting insert 160. The furcation module 150 also includes a width W that extends between the first side 163 and the second side 164 of the furcation tube mounting insert 160. The width W of the furcation tube mounting insert 160 is perpendicular relative to the length L3 of the furcation tube mounting insert 160.

Figure 10:
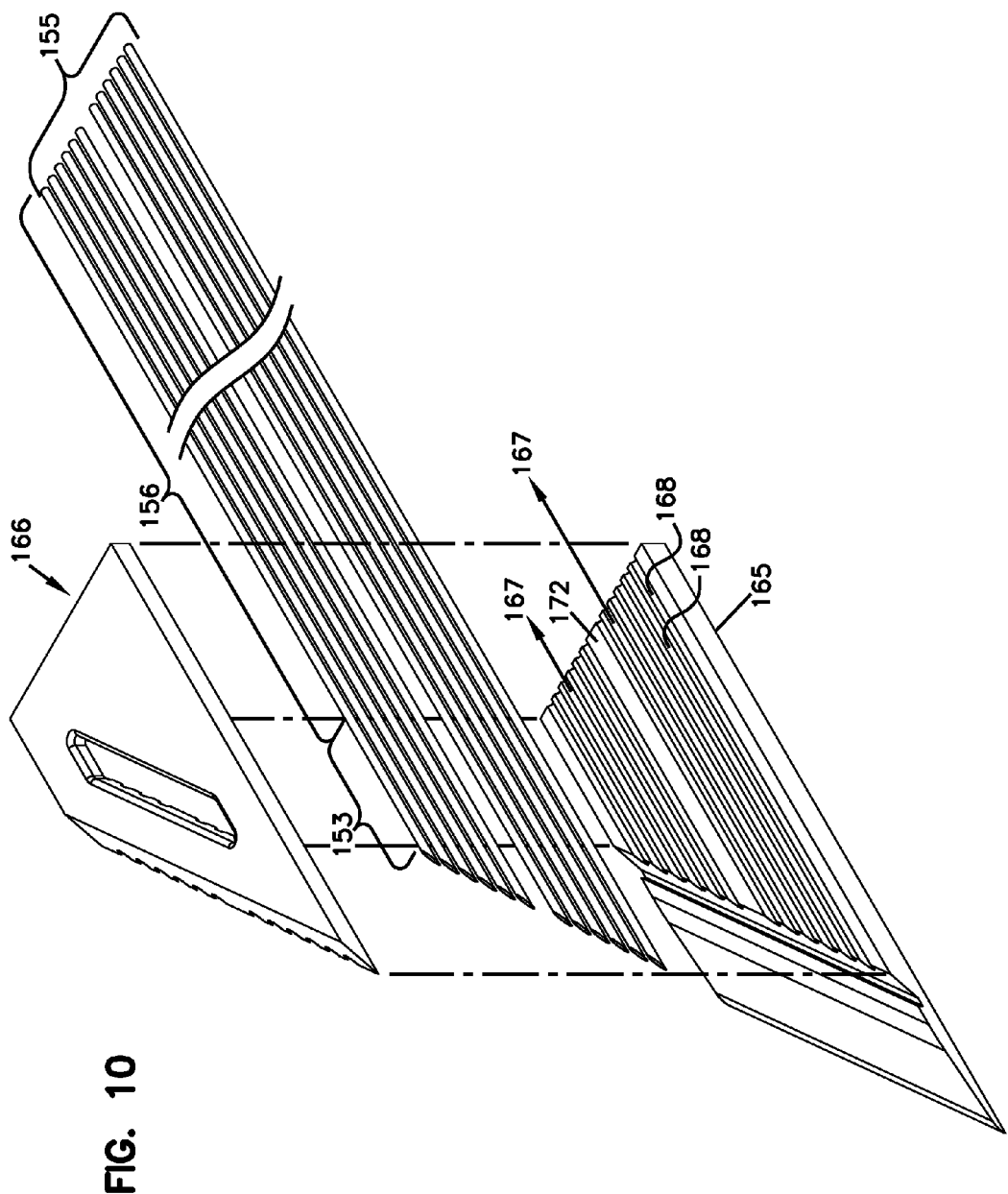
FIG. 10 shows the furcation module of FIG. 6 with first and second pieces of the furcation module exploded outwardly from furcation tubes.

The furcation tubes 155 of the furcation module 150 can have supported portions 153 and free portions 156 (see FIG. 10). The free portions 156 of the furcation tubes 155 may extend outwardly from the second end 162 of the furcation tube mounting insert 160 (see FIG. 6). The free portions 156 may have a length greater than 2 feet. Of course, other lengths can be used as well to fit particular applications. The supported portions 153 may be secured within the furcation tube mounting insert 160 (e.g., by an adhesive material or mechanically by friction or other means).

The furcation tube mounting insert 160 can include a first piece 165 and a second piece 166 (FIG. 10). The supported portions 153 are arranged and configured to be secured between the first and second pieces 165, 166 of the furcation tube mounting insert 160. As shown, the first and second pieces 165, 166 of the furcation tube mounting insert 160 can be arranged and configured so as to cooperate to define the second end 162, the first side 163, and the second side 164 of the furcation tube mounting insert 160. In an example, the first piece 165 defines the first end 161 of the furcation tube mounting insert 160. In another example, the first and second pieces 165, 166 cooperate to define the first end 161 of the furcation tube mounting insert 160.

The supported portions 153 of the furcation tubes 155 may define furcation tube axes 167 within the furcation tube mounting insert 160. The furcation tube mounting insert 160 may define parallel, inferior grooves 168 for receiving the furcation tubes 155. Half portions of each of the grooves 168 may be formed by the first and second pieces 165, 166. As shown, the furcation tube axes 167 extend parallel along the length L3 of the furcation tube mounting insert 160. The furcation tube axes 167 may be aligned along a plane P1 (see FIG. 8) extending across the width W of the furcation tube mounting insert 160.

In some implementations, the grooves 168 of the first and second pieces 165, 166 can be evenly spaced across the width W of the furcation tube mounting insert 160. In other implementations, the grooves 168 may be separated into two or more groups by one or more dividers 172. In certain implementations, a divider 172 is a portion of the first housing 165 that does not define a groove 168 (e.g., a flat portion) that is disposed between two grooves 168 (e.g., see FIG. 10).

Figure 6:
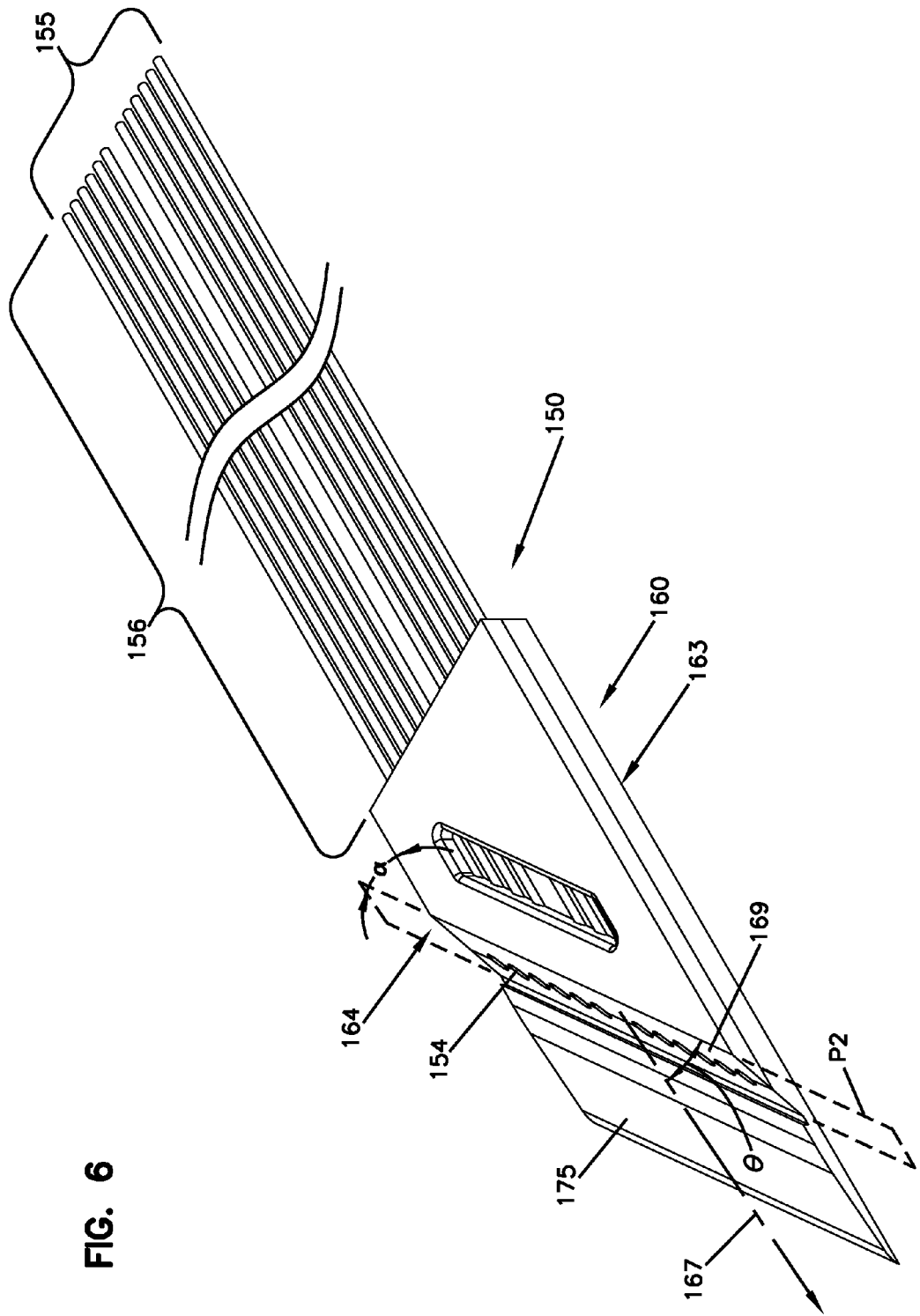
FIG. 6 is a perspective view of an example furcation module suitable for use with the fan-out subassembly of FIG. 1.

In one aspect, the first end 161 of the furcation tube mounting insert 160 can include a first end surface 169. The first end surface 169 may extend across the width W of the furcation tube mounting insert 160 between the first and second sides 163, 164 of the furcation tube mounting insert 160. As shown in FIG. 6, the first end surface 169 slants at an oblique angle θ relative to the furcation tube axes 167 as the first end surface 169 extends across the width W of the furcation tube mounting insert 160. The oblique angle θ can be in the range of 15 degrees to 45 degrees. Of course, other angles are applicable as well. It is understood that other configurations may be used according to the principles disclosed. For example, the first end surface 169 may extend orthogonally relative to the sides 163, 164 of the furcation tube mounting insert 160.

The supported portions 153 of the furcation tubes 155 can have fiber insertion ends 154 that terminate at the first end surface 169 of the furcation tube mounting insert 160. The fiber insertion ends 154 can be aligned generally along a plane P2 that is defined by the first end surface 169 and that is aligned at the oblique angle θ relative to the furcation tube axes 167. The plane P2 is also slanted at an incline angle α (see FIG. 6) relative to a major surface of the first piece 165 of the furcation tube mounting insert 160 so that the first end surface 169 generally has a ramped configuration.

In some implementations, a support flange 175 extends outwardly from the first end surface 169. In certain implementations, the support flange 175 can be ramped or tapered to aid in guiding the optical fibers 266 to the furcation tubes 155.

In another aspect, the second end 162 of the furcation tube mounting insert 160 can include a second end surface 170. The second end surface 170 may extend across the width W of the furcation tube mounting insert 160. The second end surface 170 can be perpendicular relative to the furcation tube axes 167. It is understood that other configurations may be utilized according to the principles disclosed.

The furcation tube mounting insert 160 can include a third side 171 and a fourth side 173 that is positioned opposite from the third side 171. The third and fourth sides 171, 173 can each extend across the width W and length L3 of the furcation tube mounting insert 160 between the first and second sides 163, 164 of the furcation tube mounting insert 160. As shown, the first and second sides 163, 164 are minor sides of the furcation tube mounting insert 160 and the third and fourth sides 171, 173 are major sides of the furcation tube mounting insert 160. The first piece 165 of the furcation tube mounting insert 160 defines the third side 173 of the furcation tube mounting insert 160. The second piece 166 of the furcation tube mounting insert 160 defines the fourth side 173 of the furcation tube mounting insert 160. The third side 171 can be considered a top side and the fourth side 173 can be considered a bottom side.

At least one of the third or fourth sides 171, 173 can define a slot 176. The slot 176 can extend across the width W of the furcation tube mounting insert 160. The slot 176 may be slanted at an oblique angle relative to the furcation tube axes 167. Other configurations can be utilized according to the principles disclosed. UV curable adhesive can be used to secure the furcation tubes 155 within the furcation tube mounting insert 160. The slot 176 may be used for curing the UV curable adhesive.

The furcation tube mounting insert 160 also has a height H (FIG. 9) that extends between the third and fourth sides 171, 173. The plane P2 is angled relative to the third and fourth sides 171, 173 such that the plane P2 slants at the angle α toward the second end 162 of the furcation tube mounting insert 160 as the plane P2 (and the corresponding first end surface 169) extends along the height H from the fourth side 173 (i.e., the bottom side) to the third side 171 (i.e., the top side). The ends 154 of the furcation tubes 155 are angled to coincide with the plane P2 and be flush with the first end surface 169.

The optical fibers 266 of the cable 260 extend through the furcation tubes 155 and may include distal ends that are connectorized or may be adopted to be spliced to another fiber. As shown, there are twelve furcation tubes 155. In an example, the furcation tubes 155 are separated into two groups of six by divider 172. The furcation tubes 155 can be about 900 microns in outer diameter and each furcation tube 155 include a single optical fiber 266. In certain embodiments, a furcation tube 155 has an outer diameter in the range of 600-1200 microns or in the range of 800-1000 microns, and an inner diameter larger than 240 microns. It is understood that there may be more or less furcation tubes 155 that can be utilized according to principles disclosed.

To pre-assemble and pre-cable the fan-out subassembly 100, a cable 260 is routed into the furcation module holder 110 through the cable pass-through fitting 113. The cable 260 is anchored to the module holder 110 at the cable anchor region 105. For example, a cable-tie can be wrapped around the cable jacket 262 and a tie-down anchor 117. A portion of the cable jacket 262 is removed to expose the buffer tubes 264. Optionally, strength members 268 of the cable 260 also are exposed and are secured to a strength member anchor of the module holder 110 (e.g., by wrapping the strength members around the anchor 115.

Optical fibers 266 are broken out from the buffer tubes 264 and routed to one or more furcation modules 150. The optical fibers 266 are routed (e.g., threaded) through furcation tubes 155. The furcation tubes 155 are secured between two pieces 165, 166 of the furcation modules 150. The furcation modules 150 are mounted to the module holder 110 after the tubes 155 are secured to the modules 150. For example, the furcation modules 150 can be inserted through the open top of the module holder 110 so that the free portions 156 of the furcation tubes 155 slide through the open top and open end 112 of the furcation module holder 110.

Figure 12:
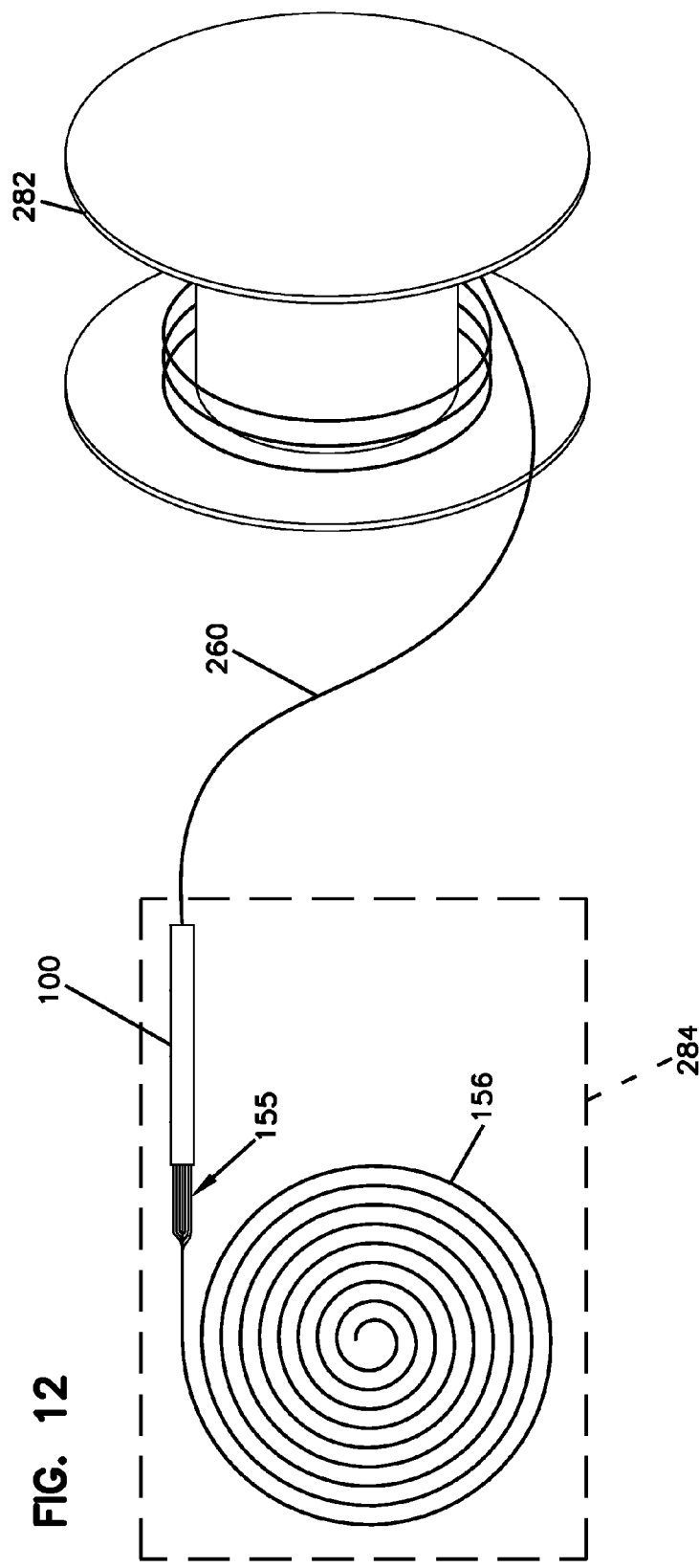
FIG. 12 is a schematic diagram of a fan-out installation assembly including the fan-out subassembly of FIG. 1 packaged and excess length of an optical cable extending from the fan-out subassembly stored on a spool.

FIG. 12 illustrates one example fan-out installation assembly 280 including a fiber optic cable 260 mounted to a fan-out subassembly 100. One end of the fiber optic cable 260 is wrapped around a cable spool 282 or other storage structure. The fiber optic cable 260 is routed into the fan-out subassembly 100 and free ends of the furcation tubes 155 extend outwardly from the fan-out subassembly 100. For ease in viewing in FIG. 12, the free portions of the furcation tubes 155 are shown as a single spiral. It is to be understood however that the free portion 156 of each furcation tube 155 can remain separate from the free portions of the other furcation tubes 155. Packaging 284 holds and manages the fan-out subassembly 100 and the free ends of the furcation tubes 155. The packaging 284 can be formed of a hard material or a soft material. Non-limiting examples of packaging 284 include a bag (e.g., plastic, fabric, mesh, etc.), a box or other rigid housing, a rolled-up piece of material (e.g., mesh, fabric, etc.), bubble wrap, etc.

As noted above, the furcation tubes 155 hold the optical fibers 266 of the cable 260. In some implementations, distal ends of the fibers 266 can be connectorized. In other implementations, the distal ends of the fibers 266 can be unconnectorized. In some implementations, the free ends of the furcation tubes 155 (and hence the distal ends of the fibers 266) are loosely contained within the packaging 284. In other implementations, the free ends of the furcation tubes 155 are coiled or otherwise managed within the packaging 284. In certain implementations, the free ends of the furcation tubes 155 secured relative to the packaging 284.

Figure 14:
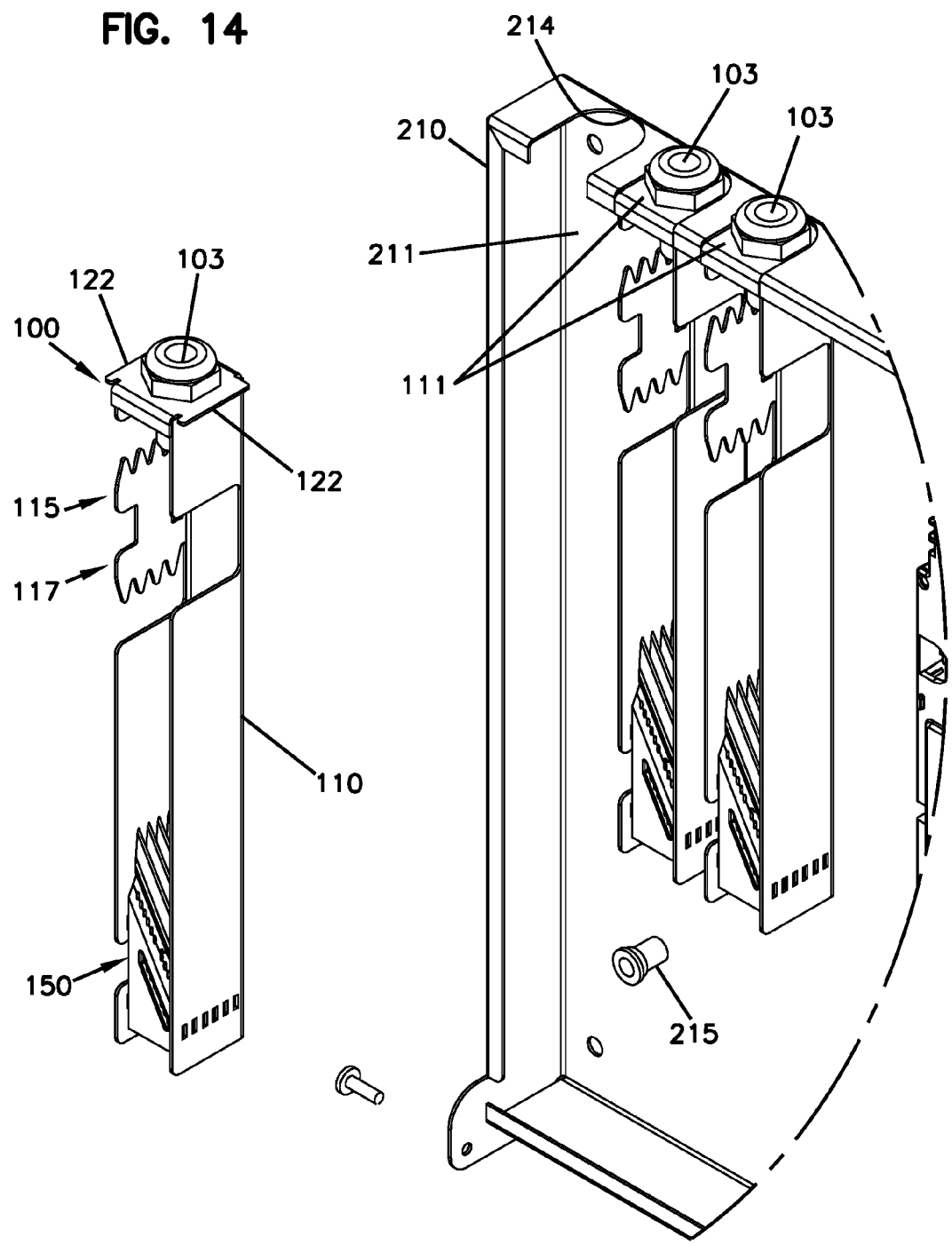
FIG. 14 is an enlarged view of a portion of FIG. 13.
Figure 15:
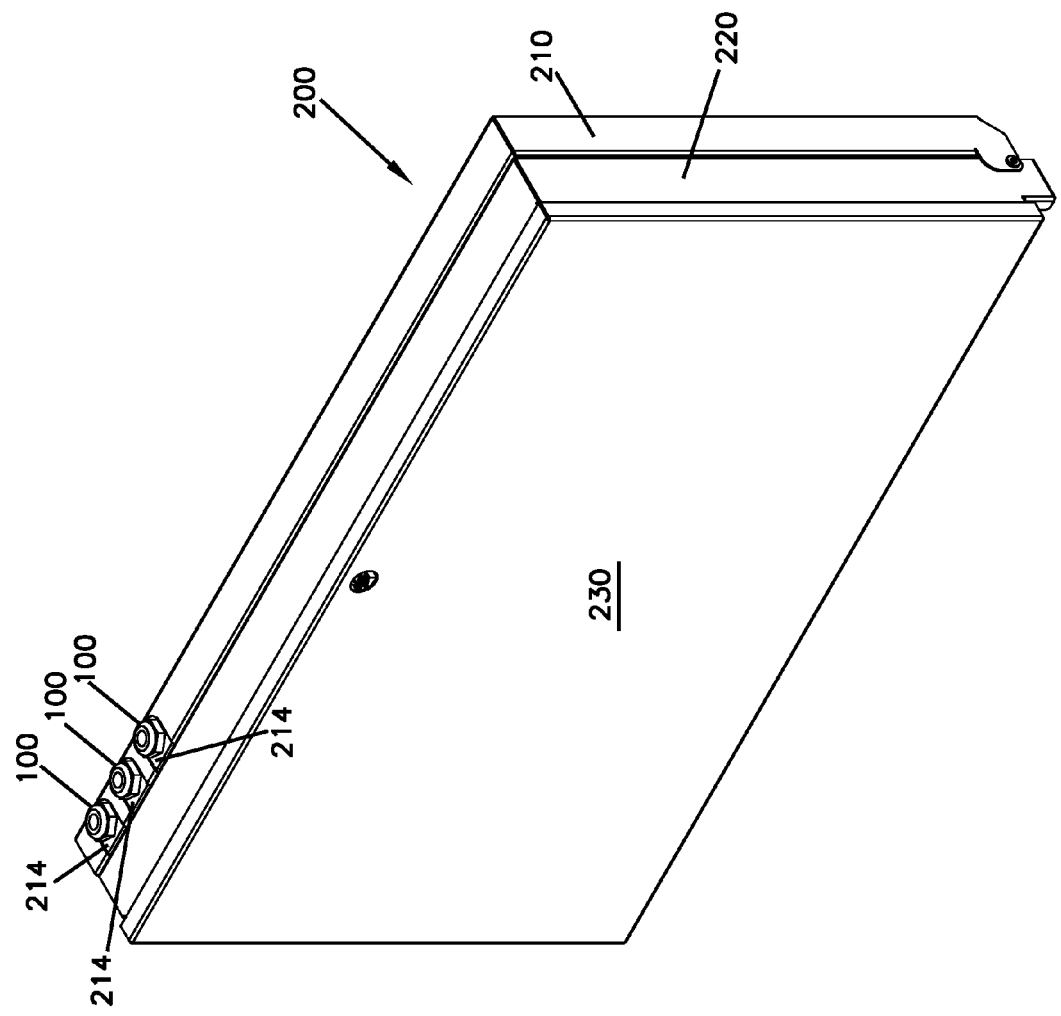
FIG. 15 is a perspective view showing the main component assembled.

FIGS. 13-15 illustrate one example main component (e.g., housing, panel, shelf, chassis, tray, drawer, etc.) 200 in which one or more fan-out subassemblies 100 can be mounted during installation of the fan-out installation assembly 280. In some implementations, the fan-out subassemblies 100 are pre-assembled and/or pre-cabled prior to being disposed at the main component 200. As the term is used herein, the fan-out subassembly 100 is pre-assembled when assembled furcation modules 150 are mounted to the furcation module holder 110 prior to installing the subassembly 100 at the main component. As the term is used herein, the fan-out subassembly 100 is pre-cabled when the optical cable is threaded through the cable pass-through fitting 113 of the holder 110 and secured to the cable anchor region 105 of the holder 110 prior to installing the subassembly 100 at the main component 200. The term also may refer to the optical fibers of the cable being threaded through furcation tubes 155 prior to installation of the subassembly 100 at the main component 200.

The example main component 200 includes a first section 210 at which one or more optical cables enter the main component 200, a second section 220 at which connectorized optical fibers are plugged into optical termination modules (e.g., adapters) 225, and a cover 230. In some implementations, each section 210, 220 is formed by an open-sided tray holding one or more optical components. In the example shown, the cover 230 is mounted over the open side of the second tray 220, which is mounted over the open side of the first tray 210. The cover 230 and trays 210, 220 can be moveably (e.g., pivotally) mounted to each other. In certain implementations, the second tray 220 defines an aperture 222 through which optical fibers and/or furcation tubes 155 can pass from the first tray 210 to the second tray 220 as will be described in more detail herein.

As shown in FIG. 13, the first tray 210 defines an interior 211 in which one or more fan-out subassemblies 100 can be mounted. For example, one or more sidewalls or edges of the tray 210 can define one or more open-ended notches 214. A fan-out subassembly 100 can be mounted within the tray 210 so that the cable port 103 aligns with one of the open-ended notches 214. Accordingly, the optical fiber cable extending through the port 103 also can extend through the open-ended notch 214. Because the notch 214 is open-ended, the fan-out subassembly 100 and the optical cable can be slid into the tray 210 through the open side of the tray 210 and the open end of the notch 214.

In some implementations, the furcation module holder 110 of the subassembly 100 includes one or more flanges 122 at the end wall 111 of the holder 110. The flanges 122 are configured to engage the sidewall or edge of the tray 210 that defines the notch 214. For example, the flanges 122 can abut against an exterior surface of the sidewall or edge to inhibit movement of the holder 110 away from the sidewall or edge and into the tray interior 211. In another example, the flanges 122 can abut against an interior surface of the sidewall or edge to inhibit movement of the holder 110 out of the interior 211 through the sidewall or edge. In another example, the flanges 122 fit into grooves defined in the sidewall or edge of the first tray 210.

In some implementations, the furcation module holder 110 includes one or more tabs 120 that each define a fastener aperture 121 through which a fastener 215 (FIG. 14) may extend to secure the holder 110 in a fixed position relative to the first tray 210. In the example shown in FIG. 14, the fastener 215 is configured to extend through the fastener aperture 121 of a tab 120 of one of the subassemblies 100. The fastener 215 holds the subassembly 100 at a fixed axial position relative to the first tray 210. When used in conjunction with modular holder flanges 122 (as described above), the fastener 215 inhibits rotation or torqueing of the subassembly 100 relative to the first tray 210.

Free portions 156 of the furcation tubes 155 extend outwardly from the fan-out subassemblies 100 and into the interior 211 of the first tray 210. In some implementations, the free portion 156 of at least one of the furcation tubes 155 can be routed through the aperture 222 of the second tray 220 and into an interior 221 of the second tray 220. For example, the free portions 156 of furcation tubes 155 holding connectorized optical fibers 266 can be routed through the aperture 222 and into an interior 221 of the second tray 220 for connection to the termination modules 225. In other implementations, the free portion 156 of at least one of the furcation tubes 155 can be routed to a splice module 212 disposed within the interior 221 of the first tray 210. For example, the free portions of furcation tubes 155 holding unconnectorized optical fibers 266 can be routed to the splice modules 212. At the splice modules 212, the unconnectorized optical fibers 266 can be routed to connectorized pigtails that extend through the aperture 222 and into an interior 221 of the second tray 220 for connection to the termination modules 225.

To install the fan-out installation assembly 280, the packaging 284 is removed from the fan-out subassembly 100 and furcation tubes 155. The fan-out subassembly 100 is mounted to the main component 200 so that the free portions 156 of the furcation tubes 155 extend within the main component. For example, the pre-assembled and pre-cabled subassembly 100 can be slid into the interior 211 of the first tray 210 through the open side of the first tray 210 and open-end of one of the tray notches 214. In various implementations, the free portions 156 of the furcation tubes 155 can be routed to the termination modules 225 of the second tray 220 and/or to the splice modules 212 of the first tray 210.

The optical cable 260 is unwound from the spool 282 as the first end of the cable 260 is routed to a connection location (e.g., to connect to an optical communications network). For example, the first end of the cable 260 can be connectorized (e.g., by one or more multi-fiber connectors, by multiple single-fiber connectors, etc.) and plugged into optical adapters or connector storage holders. Alternatively, the first end of the cable 260 can be unconnectorized and spliced (e.g., via a mechanical splice, fusion splice, etc.) to another optical cable.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fan-out subassembly adapted to be connected to a main component, the fan-out sub-assembly comprising:
   a furcation module holder configured to be mounted to the main component, the furcation module holder being elongated between a first end and a second end, the furcation module holder including a cable anchoring location;
   a cable pass-through fitting for receiving the cable is mounted at the first end of the furcation module holder; and
   a plurality of furcation modules disposed at the second end of the furcation module holder, each of the furcation modules having a furcation tube mounting insert and a plurality of furcation tubes, the furcation tube mounting insert being elongated along a common axis with the furcation module holder, the furcation tubes being supported by the furcation tube mounting inserts, the furcation tubes having free portions that extend outwardly from the furcation tube mounting inserts, the furcation tube mounting inserts being mounted to the furcation module holder and at least sections of the free portions of the furcation tubes extending outwardly from the furcation module holder.

2. The fan-out subassembly of claim 1, further comprising a cable anchored to the furcation module holder at the cable anchoring location, the cable having a plurality of optical fibers routed through the furcation tubes of the furcation modules.

3. The fan-out subassembly of claim 2, wherein the cable includes an outer jacket surrounding a plurality of buffer tubes, and wherein a plurality of the optical fibers are positioned within each of the buffer tubes.

4. The fan-out subassembly of claim 3, wherein the cable includes a tensile reinforcing structure that is anchored to the furcation module holder.

5. The fan-out subassembly of claim 4, wherein the tensile reinforcing structure includes aramid yarn.

6. The fan-out subassembly of claim 5, wherein the jacket of the outer cable is secured to the furcation module holder.

7. The fan-out subassembly of claim 6, wherein the jacket is secured to the furcation module holder by a cable tie.

8. The fan-out subassembly of claim 1, wherein the furcation tube mounting inserts are stacked on the furcation module holder.

9. The fan-out subassembly of claim 1, wherein the furcation module holder is mounted to the main component by a structure selected from the group consisting of a fastener, a latch, a hook, a tab, a snap-fit, and a flange.

10. The fan-out subassembly of claim 1, wherein the main component is selected from a group consisting of a telecommunications housing, a telecommunications panel, and a telecommunications shelf.

11. The fan-out subassembly of claim 1, wherein the furcation module holder includes a base having a length that extends along the axis from the first end to the second end of the furcation module holder, wherein the furcation module holder includes an end wall provided at the first end of the furcation module holder, wherein the cable pass-through fitting for receiving the cable is mounted at the end wall, and wherein the furcation tube mounting inserts are stacked at the second end of the furcation module holder.

12. The fan-out assembly of claim 11, wherein the furcation module holder includes opposing side walls that extend between the first and second ends of the furcation module holder and that cooperate with the base to define an open-topped channel that extends along the axis of the furcation module holder, wherein the furcation tube mounting inserts are mounted between the opposing side walls, wherein the cable anchoring location is positioned at an intermediate location between the first and second ends of the furcation module holder, and wherein the optical fibers are routed through the open-topped channel from the anchoring location to the furcation modules.

13. A kit for fanning out fibers at a main component, the kit comprising:
   a cable spool assembly including an optical cable wrapped around a spool, the optical cable including an outer jacket surrounding a plurality of buffer tubes, each of the buffer tubes holding a plurality of optical fibers; and
   a fan-out subassembly into which a portion of the optical cable is routed, the fan-out subassembly including:
      a furcation module holder configured to be mounted to the main component, the furcation module holder including a cable anchoring location at which the optical cable is secured to the furcation module holder; and
      a plurality of furcation modules each having a furcation tube mounting insert and a plurality of furcation tubes, the furcation tubes having supported portions that are supported by the furcation tube mounting inserts, ends of the supported portions being aligned along a plane that is aligned at an oblique angle relative to tube axes of the furcation tubes, the furcation tubes having free portions that extend outwardly from the furcation tube mounting inserts, the furcation tube mounting inserts being mounted to the furcation module holder and at least sections of the free portions of the furcation tubes extending outwardly from the furcation module holder, wherein the optical fibers of the optical cable are routed through the furcation tubes of the furcation modules.

14. The kit of claim 13, further comprising packaging holding the fan-out subassembly.

15. The kit of claim 13, wherein the furcation module holder is elongated between a first end and a second end, and wherein a cable anchoring location is disposed at an intermediate location between the first and second ends of the furcation module holder.

16. The kit of claim 13, wherein the furcation module holder includes a plurality of sidewall arrangements extending upwardly from a base, and wherein the strength member anchor forms part of one of the sidewall arrangements.

17. The kit of claim 16, wherein an opposite one of the sidewall arrangements defines an opening or cut-out region to provide finger access to the cable anchoring location.

18. A fan-out subassembly adapted to be connected to a main component, the fan-out sub-assembly comprising:
   a furcation module holder configured to be mounted to the main component, the furcation module holder being elongated along a first axis between a first end and a second end, the furcation module holder defining a first width extending transverse to the first axis, the furcation module holder including a cable anchoring location;

a cable pass-through fitting for receiving the cable is mounted at the first end of the furcation module holder; and a plurality of furcation modules disposed at the second end of the furcation module holder, each of the furcation modules having a second width that extends over a majority of the first width of the furcation module holder, each furcation module including a furcation tube mounting insert and a plurality of furcation tubes.

19. The fan-out subassembly of claim 18, wherein the furcation module holder includes parallel sidewalls that define a channel therebetween; wherein the furcation modules are disposed in the channel.

20. The fan-out subassembly of claim 19, wherein each furcation module is elongated along the first axis when disposed at the second end of the furcation module holder.

\* \* \* \* \*